(12) United States Patent
Park

(10) Patent No.: US 6,421,825 B2
(45) Date of Patent: Jul. 16, 2002

(54) REGISTER CONTROL APPARATUS AND METHOD THEREOF FOR ALLOCATING MEMORY BASED ON A COUNT VALUE

(75) Inventor: Soung-Hwi Park, Busan (KR)

(73) Assignee: Hynix Semiconductor Inc., Kyoungki-Do (KR)

( * ) Notice: Subject to any disclaimer, the term of this patent is extended or adjusted under 35 U.S.C. 154(b) by 0 days.

(21) Appl. No.: 09/770,450

(22) Filed: Jan. 29, 2001

Related U.S. Application Data

(63) Continuation of application No. 08/716,624, filed on Sep. 19, 1996.

(30) Foreign Application Priority Data

Sep. 22, 1995 (KR) ............................................. 95-31429

(51) Int. Cl.$^7$ ................................................. G06F 9/45
(52) U.S. Cl. ........................ 717/157; 717/141; 711/220
(58) Field of Search ........................... 717/8, 157, 141; 709/104; 711/132, 220, 209; 712/41, 228

(56) References Cited

U.S. PATENT DOCUMENTS

| | | | | |
|---|---|---|---|---|
| 5,043,870 A | * | 8/1991 | Ditzel et al. | 711/132 |
| 5,179,685 A | * | 1/1993 | Nojiri | 712/41 |
| 5,564,031 A | * | 10/1996 | Amerson et al. | 711/209 |
| 5,615,348 A | * | 3/1997 | Koino et al. | 712/228 |
| 5,655,132 A | * | 8/1997 | Watson | 709/104 |

OTHER PUBLICATIONS

"Compiler Design in C", Allen I. Holub, published Mar. 27, 1990 pp. 673.*
"Principles of Compiler Design", by Alfred Aho et al., published Apr. 1979, pp. 19–20, 518–562.*
"Structured Computer Organization", Third Edition, Adrew Tanenbaum, published 1990, pp. 443–447.*
Microsoft Press Computer Dictionary second edition, Published Nov. 10, 1993, pp. 85,86,240,345, 94 and 336.*
Compilers Principles, Techniques and Tools, Aho et al. Sep. 12, 1985, Chapters 1–9.*

* cited by examiner

Primary Examiner—Gregory Morse
Assistant Examiner—Todd Ingberg
(74) Attorney, Agent, or Firm—Birch, Stewart, Kolasch & Birch, LLP

(57) ABSTRACT

In a register controlling apparatus, whenever a routine is run, a register logicalal address, and the values of a local register pointer and a local register counter are selectively added, and thereby a register physical address and a new value of the local register pointer are outputted, resulting in the setting of the register available domain. Then, when the routine returns to a higher order routine, the set register available domain is released to be called by another subroutine, and further, when a register in another routine is accessed in an arbitrary routine, the register logical address is outputted as the register physical address to achieve the accessing, resulting in accomplishing an enhanced application efficiency of the register and an easy processing of a routine using many registers.

36 Claims, 7 Drawing Sheets

ROUTINE A

ROUTINE B

ROUTINE C

ROUTINE D

ROUTINE A

ROUTINE B

ROUTINE C

ROUTINE D

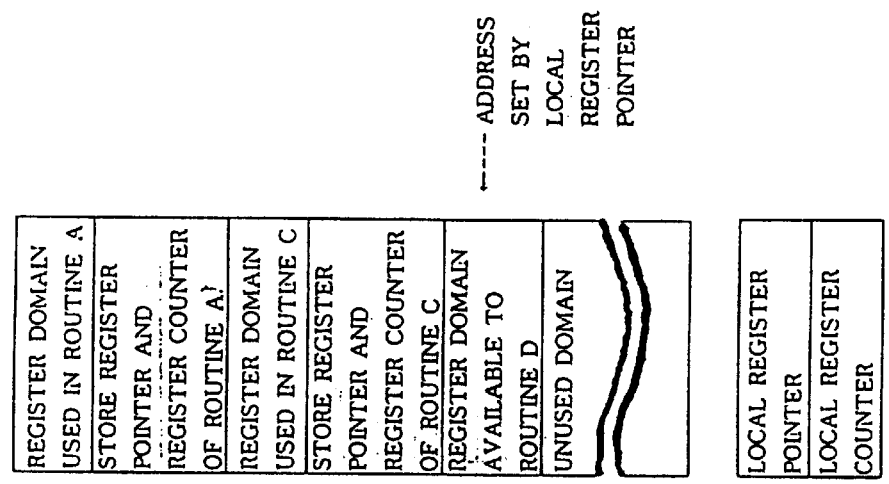
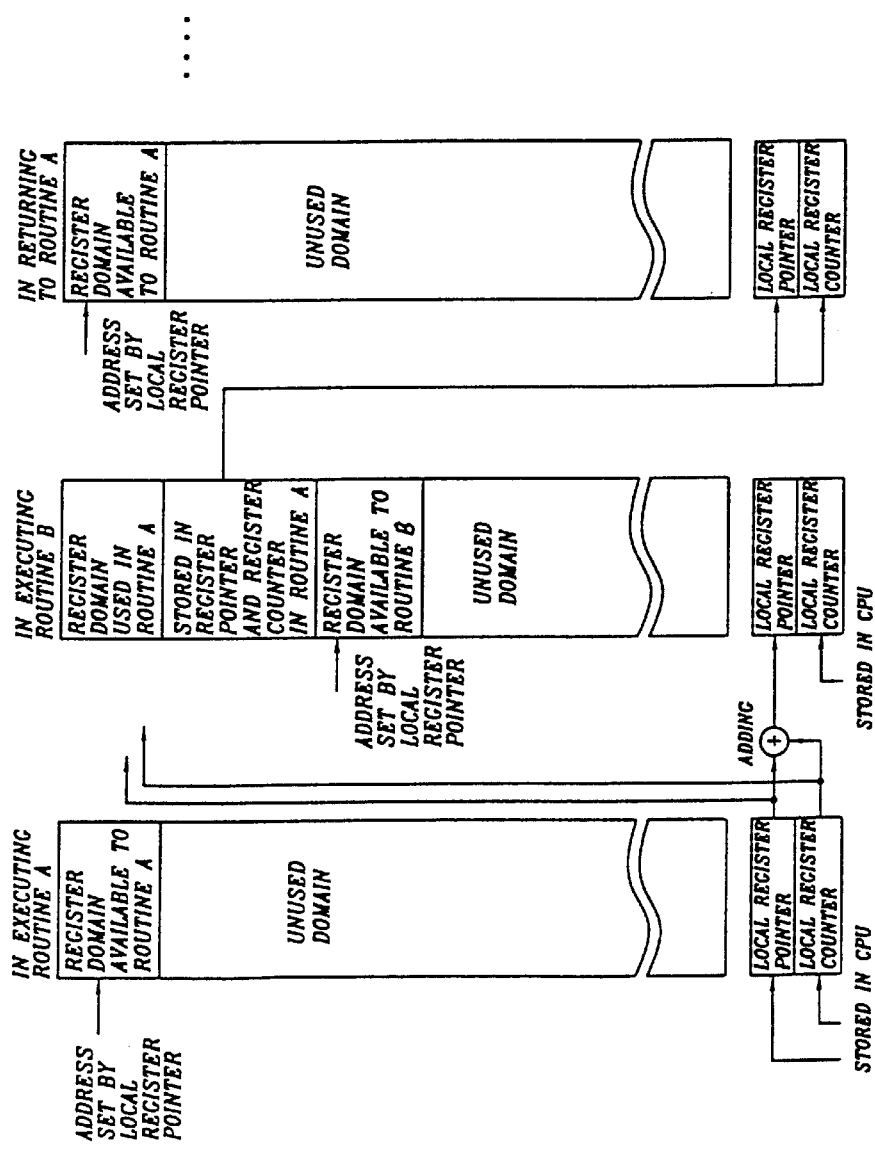

REGISTER CONTROL APPARATUS AND METHOD THEREOF FOR ALLOCATING MEMORY BASED ON A COUNT VALUE

This application is a continuation of application Ser. No. 08/716,624, filed Sep. 19, 1996.

BACKGROUND OF THE INVENTION

1. Field of the Invention

The present invention relates to a register controlling apparatus, and in particular, to an improved register controlling apparatus which is capable of processing a C programming language instructions efficiently and at a high speed in a central processing unit (hereinafter, called CPU) by controlling a plurality of registers.

2. Description of the Prior Art

Conventionally, a register is a semiconductor memory device which is accessed by a CPU and employed in the writing and reading of data and various kinds of operations.

In the case of a reduced instruction set computer (RISC)-type CPU, there are provided tens of or hundreds of registers, and the construction of all the registers is divided into 2–16 banks.

As shown in FIG. 1, the conventional register controlling apparatus includes a CPU 1 for outputting a register address (Raddr) in accordance with control data input through a data or reading written data bus, and a memory 2 for writing data in a corresponding domain in accordance with the register address (Raddr) output from the CPU.

The register addresses are sequential from the first to the last with consecutive numbers, and each address corresponds to a respective register.

Referring to the accompanying drawings, the operation of the conventional register controlling apparatus will now be described in detail.

First, when an arbitrary program routine is set by the user, the CPU 1 receives control data through the data bus and then outputs a register address (Raddr). The memory 2 selects each corresponding address in accordance with the register address (Raddr) and runs the set routine.

Each register has a consecutive address, and when there are one hundred registers, the register addresses include Raddr0–Raddr99.

When the user enters a subroutine from an arbitrary program routine to run a more efficient high-level language, such as a C programming language, he or she should know how to use a new routine in the subroutine.

When the user is using n registers in an arbitrary routine and wants to call a subroutine to use m registers, to implement the subroutine, he or she should know which register he or she used in the high order routine and which register he or she can use in the present routine.

That is, when the user is using 11 registers (R0–R10) in the high order routine and wants to call a subroutine to use seven registers, he or she can use registers R11–R17.

The above-described operation would be programmed as follows:

```
Routine A( )  {                  : declaring a high order routine
  integer R0, R1, R2, ..., R10;  : arraying the registers used in
                                   the routine A
```
```
  subroutine B( )                : the program text
                                 : calling a subroutine B
                                 : the program text
  }                              : terminating routine A
  Subroutine B( )  {             : setting a subroutine B
  integer R11, R12, ..., R 17    : arraying the registers used in
                                   the routine B
                                 : the program text
  }                              : terminating subroutine B
```

That is, when allocating the programs, as shown above, the subroutine B should know in advance that registers R0–R10 will be used in the routine A due to the characteristic that a register having a specific address is used only in a specific routine.

Therefore, when a register is to be used in each routine through some program, as shown in FIG. 3, the CPU 1 accesses a register allocated in each routine (A, B, C, . . . , N) in accordance with the flow of the program.

However, in the above-described procedure, it is very difficult to create a program because a register domain used by each routine should be set in advance when creating a program, and a register having a specific address has a low usage efficiency since the register having the specific address can use only the specific address.

Further, since the above-mentioned program is not proper for a high level language, especially for a C programming language, a low level language such as an assembly language should be disadvantageously used.

In addition, although, a program managing a register (or a memory) may be added when compiling a program to prevent the above-described problem, the size of the program is enlarged and the running speed is undesirably slowed down.

FIG. 2 is another embodiment of the conventional register controlling apparatus, wherein to solve the above-described problem, a higher performance RISC type CPU is substituted for the CPU 1 in FIG. 1, and the entire register range is divided into N register banks (4-1, 4-2, . . . , 4-n) to be used as the memory 2.

Here, the RISC type CPU 3 has tens or hundreds of registers. That is, the entire register range is divided into 2–16 banks and each bank includes eight or sixteen registers.

This conventional register controlling apparatus will now be described in detail.

First, when the user runs a program and performs an arbitrary routine, the RISC type CPU 3 selects one register bank in a register stack divided into the N register banks 4-1, 4-2, . . . , 4-n. Then by using a register allocated in the selected register bank, the present routine is run.

When the user calls a subroutine from the present routine which is a high order routine, the called subroutine automatically selects the next register bank in the register stack divided into the N register bank 4-1, 4-2, . . . , 4-n to run the program and then returns to the high order routine when the running of the program is done.

When the subroutine returns to the high order routine, since the register bank which the subroutine selected and used is automatically released, the register bank can be reused when the subroutine is called from the high order routine next time.

That is, as shown in FIG. 4, when a subroutine B is called while using the register Bank0 4-1 in a high order routine A, the called subroutine B uses the next register Bank1 4-2, and then returns to the high order routine A and the selection of the register Bank1 4-2 is released.

Then, when a subroutine C is called from the high order routine A, the called subroutine C can also use the register Bank1 4-2 used in the subroutine B, and when a subroutine D is called from the subroutine C, the called subroutine D can use a next register Bank2 4-3.

When the selected register Bank2 4-3 returns to the high order routine C from the subroutine D, the selection of the register Bank2 4-3 is released. Therefore, when a subroutine E is called from the subroutine C, the called subroutine E can use the register Bank2 4-3 used in the previous subroutine C.

Therefore, in this conventional register controlling apparatus, when a subroutine is called from a high order routine to run a program and returns to the high order routine, since the register bank used in the previous subroutine can be used in another subroutine, the register controlling apparatus can achieve improved application efficiency of the register, while remaining suitable for the processing of the program created in the C programming language.

However, in another embodiment of the conventional register controlling apparatus, since the entire register complement is divided into a predetermined number of register banks, registers are sometimes lacking or overabundant depending on the run routine, resulting in the undesirable lowering of the application efficiency of the register.

That is, in some specific subroutines so few registers are used that many unused registers remain, while in other subroutines, subroutines are called continuously enough to exceed the number of register banks primarily because, the registers of one bank that service one routine can not be used in servicing another register even if they are not being used, resulting in the lack of available registers.

In addition, when a parameter between each routine in a C programming language is set to be an address of an arbitrary variable, a variable of one routine is difficult to access from another routine.

SUMMARY OF THE INVENTION

Accordingly, it is an object of the present invention to provide an improved register controlling apparatus which is capable of setting the number of registers used by each routine suitably depending on each routine, and of processing the calling of subroutines until all the registers are used when each routine uses a small number of registers.

It is another object of the present invention to provide an improved register controller which is capable of setting an available register domain by selectively adding up the values of a register logical address and a local register pointer from CPU and the value of a local register counter and of performing the continuous calling of another subroutine from a higher order routine by releasing the set register available domain when a subroutine returns to a higher order routine.

To achieve the above object, there is provided an enhanced register controlling apparatus which includes a CPU for outputting the values of the register logical address, a first control signal and local register pointer, and the number (count value) of available registers, a register controller for selectively adding the values of a register logical address and a local register pointer, and the number (count value) of available registers and outputting a register physical address, and a memory for writing data in a domain set by the register physical address of the register controller or reading the written data.

To achieve another object of the present invention, there is provided a semiconductor apparatus in which a register controller controls the creation and access operation of a register physical address for the storing domain of a memory, wherein the register controller include a control circuit for outputting first and second control signals, respectively, in accordance with the control of a CPU, a local register pointer for setting a start address of register domains which will be used in a presently running program routine, a local register counter for setting the number of registers which will be used in the present/y running program routine, and an adder for adding the register logical addresses outputted from the CPU in accordance with the first control signal from the control circuit and the values of the local register pointer and then outputting a register physical address.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 8A through 8D are views showing examples of how a register available domain is set depending on the running of the program in FIG. 7.

DETAILED DESCRIPTION OF THE PREFERRED EMBODIMENTS

Figure 1:
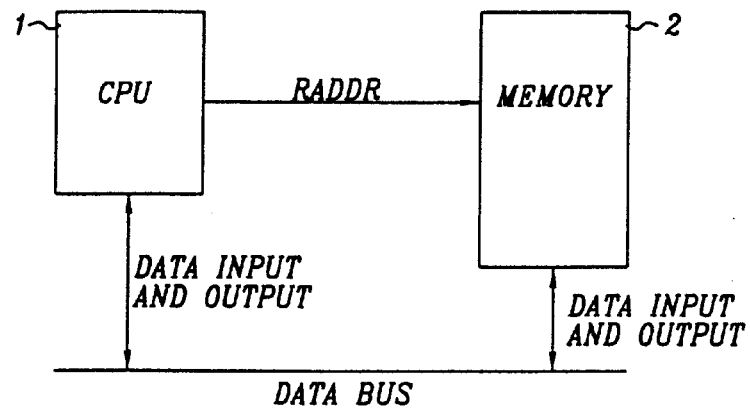
FIG. 1 is a block diagram of a register controlling apparatus according to the conventional art.
Figure 2:
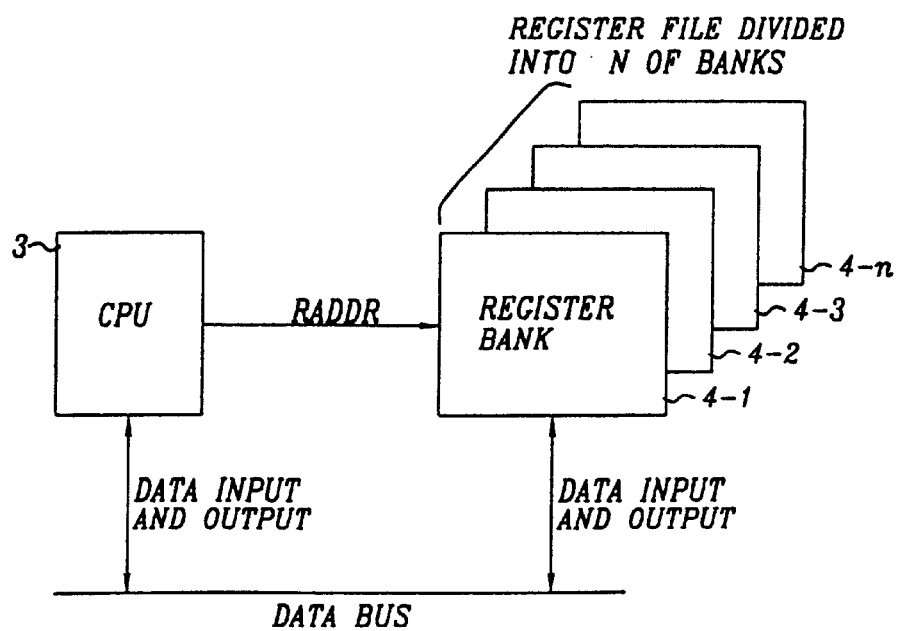
FIG. 2 is a block diagram of another register controlling apparatus according to the conventional art.
Figure 3:
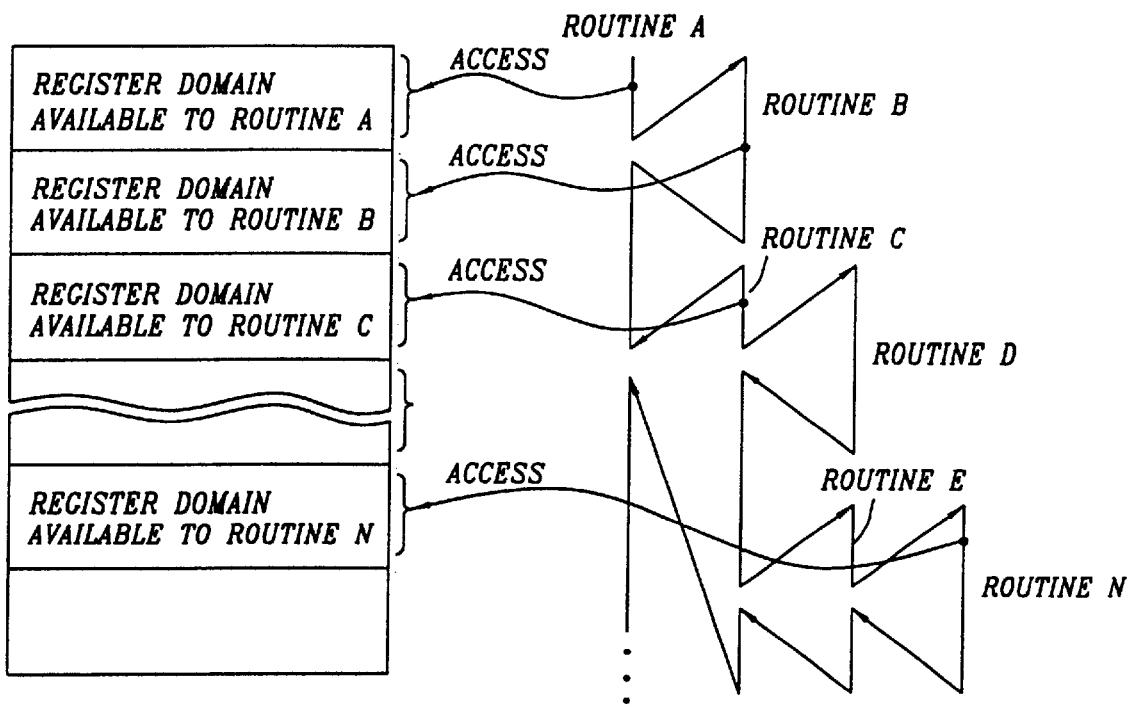
FIG. 3 shows an example of the running order of a program and the setting of a register available domain in the apparatus of FIG. 1.
Figure 4:
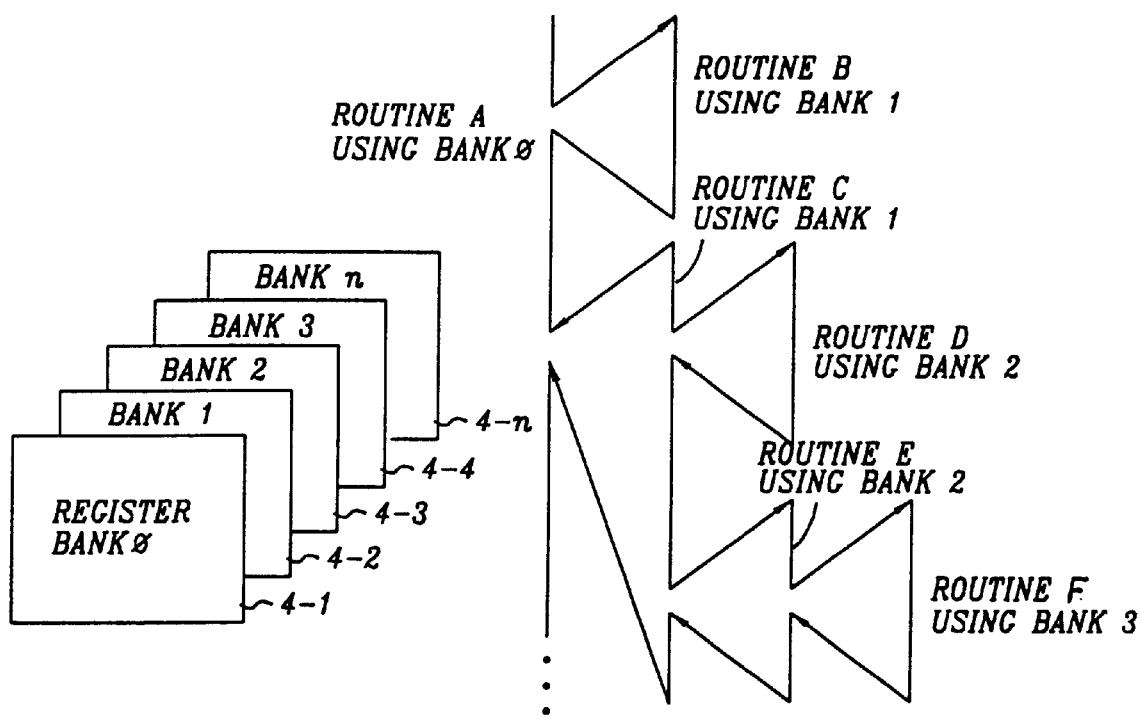
FIG. 4 shows an example in which a register bank is used according to the running order of the program according to the conventional art.
Figure 5:
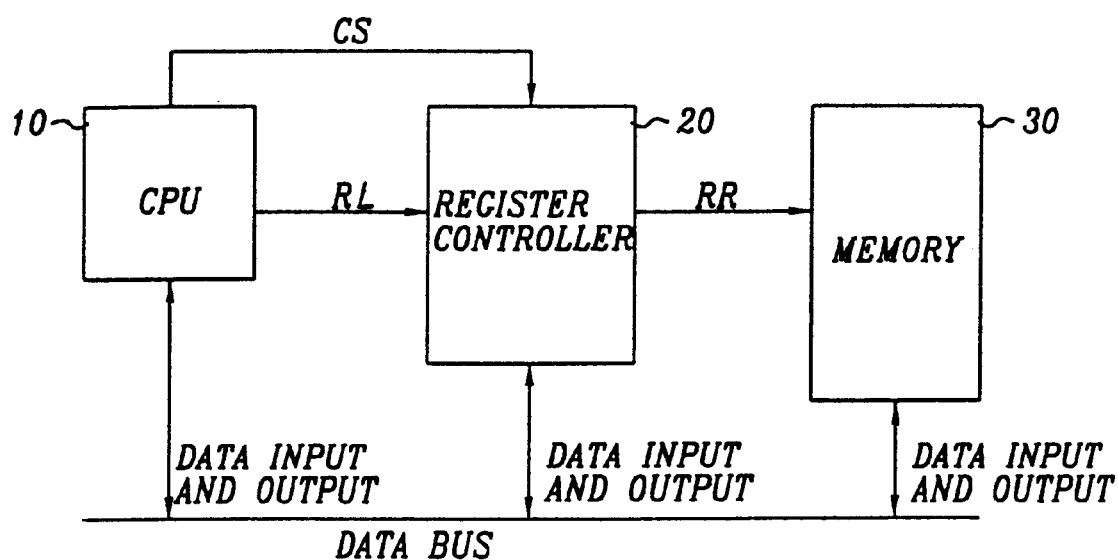
FIG. 5 is a block diagram of a register controlling apparatus according to the present invention.

As shown in FIG. 5, a register controlling apparatus according to the present invention includes a CPU 10 for outputting register logical address (RL) values, a control signal (CS) and a local register pointer when a program routing is selected and the number (count value) of available registers, a register controller 20 for selectively adding the values of the register logical address RL and the local register pointer, and the number (count value) of available registers in accordance with the control signal (CS) from the CPU 10 and for outputting a register physical address (RR), and a memory 30 for writing data in a domain set based on the register physical address (RR) from the register controller 20 or reading the written data.

Figure 6:
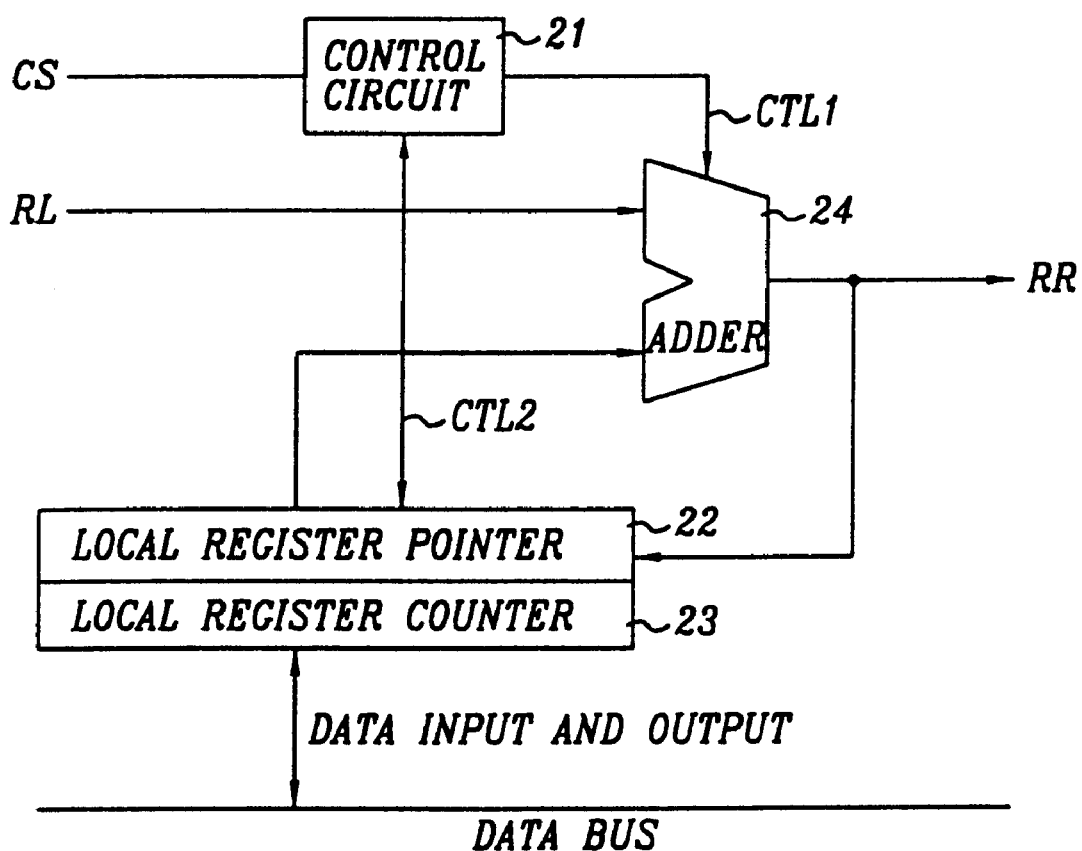
FIG. 6 is a detailed block diagram of a register controller in FIG. 5.

As shown in FIG. 6, the register controller 20 includes a control circuit 21 for outputting control signals (CTL1, CTL2) in accordance with the control signal (CS) from the CPU 10, a local register pointer 22 for receiving, storing and outputting the value of a local register pointer denoting a start address of a register domain from the CPU 10, a local register counter 23 for receiving, storing and outputting the number (count value) of the registers from the CPU 10, and an adder 24 for selectively adding up the number of the register logical address (RL), the start address of the register domain and the count value of the registers in accordance with the control signal CTL1 from the control circuit 21 and outputting a register physical address (RR).

The adder 24 outputs the register physical address (RR) corresponding to the register logical address (RL) in accordance with the control signal (CTL1) from the control circuit 21, or adds the values of the register logical address (RL) and the local register pointer 22 and then outputs the register physical address (RR), or adds the values of the local register pointer 22 and the local register counter 23 and outputs a new pointer value to the local register pointer 22.

The local register pointer 22 outputs the value of the pointer stored in accordance with the control signal (CTL2) or performs the inputting and outputting of data through the data bus.

The local register counter 23 outputs the number (count value) of the register stored in accordance with the control signal (CTL2) or performs the inputting and outputting of data through the data bus.

Referring to the accompanying drawings of the block diagrams, the register controlling apparatus according to the present invention will now be described.

Figure 7:
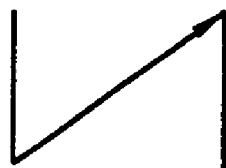
FIG. 7 shows an example of a running order of a program in the inventive apparatus FIG. 5.
Figure 7:
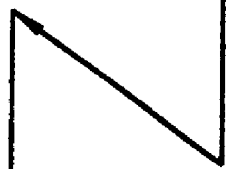
Figure 7:
Figure 7:

Assume, for example, that the running order of the program set by the user will be performed as shown in FIG. 7.

First, when a routine A is run, the CPU outputs a register address from which the routine A starts and the number of registers available to the routine A to the data bus and stores them in the local register pointer 22 and the local register counter 23, respectively, as shown in FIG. 8A.

The value of the local register pointer 22 is an arbitrary one, and the value of the local register counter 23 is determined when compiling a program.

For example, in creating a program, since the type and number of variables are declared, as shown in the following program routine written in the C programming language, these two factors are reflected when compiling the program.

```
Routine A( )    {          : declaring a routine name
int R0 , R1 , . . . Rn-1   : declaring the type and number of
variables
                .          : the contents of the program
            }              : finishing the routine
```

Accordingly, the adder 24 adds the values of the register logical address (RL) and the local register pointer 22 outputted from the CPU 10 and outputs the register physical address (RR), and thereby, a register domain which a routine will use in the memory 30 is determined and the registers are accessed in the determined register domain.

Then, when a subroutine B is called in the routine A, as shown in FIG. 8B, the values of the local register pointer 22 and the local register counter 22 in the routine A are output to the memory through the data bus in accordance with the control signal (CTL2) from the control circuit 21.

The local register pointer 22 and the local register counter 23 output the values of the pointer and the counter stored in accordance with the control signal (CTL2) to the adder 24, which adds the values of the local register pointer 22 and the local register counter 23 and outputs the added value as the register physical address (RR).

Then, the register physical address (RR) is stored again in the local register pointer 23, and set a start address of a register domain which the routine B will use. The local register counter 24 receives and stores the number of registers which the routine B will use from the CPU 10 through the data bus in accordance with the control signal (CTL2), resulting in the decision of a register domain which the routine B uses.

Then, when the register logical address (RL) for setting a start address of the routine B is output from the CPU 10, in order to run the routine B, the adder 24 receives the pointer value from the local register pointer 22, and adds the inputted pointer value and the register logical address (RL) and outputs the register physical address (RR), and thereby gets access to the corresponding registers of the memory 30.

When the routine B is done and processing returns to the routine A, as shown in FIG. 8C, the values of the local register pointer 22 and the local register counter 23 in the routine A stored in the memory 30 are stored again in the local register pointer 22 and the local register counter 23 through the data bus, resulting in the continued running of routine A in the program.

When the program returns to the routine A from routine B, the register domain set for routine B is released.

Then, when a subroutine C is called in the routine A, the same operation as when the subroutine B was called in the routine A is repeated, and the register domain which the routine C will use is determined.

When a subroutine D is called in the routine C, as shown in FIG. 8D, a register available domain for the routine D is decided next to the register available domain for the routine C.

Meanwhile, when the CPU 10 outputs the control signal (CS) and the register logical address (RL) in order to get access to a register domain of another routine from an arbitrary routine, the adder 24 outputs the register logical address (RL) inputted from the CPU 10 in accordance with the control signal (CTL1) from the control circuit 21 as the register physical address (RR), and thereby the memory 30 performs the inputting and outputting of data in a domain set by the register physical address (RR) outputted from the register controller 20.

As described in detail above, according to the present invention, the number of the registers used in a specific routine is set suitably for each routine. Therefore even when each routine uses a small number of registers, since the callings of the subroutines can be processed until all the registers are all used, an improved application efficiency of the registers can be achieved.

Further, according to the present invention, since the limit of the number of the registers usable in one routine is the total number of the entire registers, a routine which uses many registers can be easily processed.

Therefore, an easier creation of a program and a faster processing speed can be realized, and especially such a high level language as a C programming language can be processed with less effort.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A register controlling apparatus, comprising:

a storage device for storing a local register pointer corresponding to a first address from which a first program routine is initiated;

a compiler for determining a count value based on a type and a number of variables declared by the first program routine, said count value corresponding to a total number of registers reserved for use by the first program routine; and a register controller that determines a second address from which memory for a subsequently invoked second program routine is allocated by adding the local register pointer and the count value, wherein the register controller adds the local register pointer and the count value only after the second program routine that requires additional registers has been selected.

2. The register controlling apparatus of claim 1, further comprising:

a processor for outputting a register logical address, a first control signal, the local register pointer and the count value when the second program routine is selected; and a memory for reading and writing data with respect to a domain set identified by the second address determined by the register controller, wherein the register controller outputs the second address in accordance with the first control signal.

3. The apparatus of claim 2, wherein the register controller comprises:

a control circuit for outputting second and third controller signals in accordance with the first control signal from the processor;

a local register pointer for receiving and storing the value of the local register pointer representing a start address of the domain set for the second program routine from the processor and outputting the value in accordance with the third control signal;

a local register counter for receiving and storing the count value of the registers from the processor and outputting the count value in accordance with the third control signal; and an adder for selectively adding the value of the local register pointer and the local register counter from the processor in accordance with the first control signal from the control circuit and then outputting the address and a new value of the local register pointer.

4. The apparatus of claim 3, wherein the adder selectively adds the value of the local register counter to the local register pointer from the processor and then outputs the second address when the second program routine is called during execution of the first program routine.

5. The apparatus of claim 3, wherein the adder outputs the local register pointer as a third address in accordance with the second control signal when a register domain in another routine is accessed by the second program routine.

6. The apparatus of claim 3, wherein the local register pointer stores the added value output from the adder as a start address of an available domain of the second program routine when the second program routine is called by the first program routine.

7. The apparatus of claim 6, wherein the available domain of the second program routine is set next to the available domain of the first program routine whenever the domain of the second program routine is called.

8. The apparatus of claim 3, wherein the local register counter stores the number of the registers which is a corresponding routine will use from the processor whenever the second program routine is called by the first routine.

9. The apparatus of claim 3, wherein the local register pointer and the local register counter receive and store the values of the local register pointer and the local register counter for a higher order routine stored in the memory to perform the continuous running of the returning higher order routine, when they return from a subroutine to the higher order routine.

10. The apparatus of claim 9, wherein the register domain set for the subroutine is released when the subroutine returns to the higher order routine.

11. The apparatus of claim 2, wherein the memory stores the value of the local register pointer and the local register counter of a higher order routine when a subroutine is called in a presently running higher order routine.

12. The apparatus of claim 1, wherein the second address does not overlap the registers reserved for use by the first program routine.

13. The apparatus of claim 1, wherein upon completion of the second program routine, the registers allocated to the second program routine are released for reuse by a third program routine.

14. The apparatus of claim 1, wherein the count value includes only the registers needed by the first program routine.

15. A method of controlling a register, controlling:

storing a local register pointer corresponding to a first address from which a first program routine is initiated;

determining a count value based on the type and number of variables declared by the first program routine, said count value corresponding to a total number of registers reserved for use by the first program routine; and determining a second address from which memory for a subsequently invoked second program routine is allocated by selectably adding the local register pointer and the count value.

16. The method of claim 15, further comprising:

outputting a register logical address, a first control signal, the local register pointer and the count value when the second program is selected; and reading and writing data with respect to a domain set identified by the second address determined by the register controller, where the second address is output in accordance with the first control signal.

17. The method of claim 16, wherein the selectably adding step comprises:

outputting second and third control signals in accordance with the first control signal;

receiving and storing the value of the local register pointer representing a start address of the domain set for the second program routine and outputting the value in accordance with the third control signal;

receiving and storing the count value and outputting the count value in accordance with the third control signal; and selectively adding the values of the local register pointer and the local register counter in accordance with the first control signal and then outputting the [address and a new value of the local register pointer.

18. The method of claim 17, wherein the value of the local register counter is added to the register logical address and the local register pointer is output when the second program routine is called during execution of the first program routine.

19. The method of claim 17, wherein the local register pointer is output as a third address in accordance with the second signal when a register domain in another routine is accessed during the second program routine.

20. The method of claim 17, wherein a sum of the local address, the value of the local register pointer and the local register counter is stored as a start address of an available domain of the second program routine when the second program routine is called by the first program routine.

21. The method of claim 20, wherein the available domain of the second program routine is set next to the available domain of the first program routine whenever the domain of the second program routine is called.

22. The method of claim 17, further comprising storing the number of the registers that a corresponding routine will use whenever the second program routine is called by the first program routine.

23. The method of claim 17, wherein the local register pointer and the local register counter receive and store the values of the local register pointer and the local register counter for a higher order routine to perform the continuous running of the higher order routine, when they return from a subroutine to the higher order subroutine.

24. The method of claim 23, further comprising releasing the register domain set for the subroutine when the subroutine returns to the higher order routine.

25. The method of claim 16, further comprising storing the values of the local register pointer and the local register counter of a higher order routine when a subroutine is called in a presently running higher order routine.

26. The method of claim 15, further comprising:
allowing the second program routine to complete;
reallocating the memory allocated to the second program routine to a third program routine.

27. The method of claim 15, wherein the second address does not overlap the registers reserved for use by the first program routine.

28. The method of claim 15, wherein the count value is determined by a compiler and the count value includes only the registers needed by the first program routine.

29. A register controlling apparatus comprising:
a storage device for storing a local register pointer corresponding to a first address from which a first program in initiated;
a compiler for determining a count value based on a type and a number of variables declared by the first program routine, said count value corresponding to a total number of registers made available to perform the first program routine; and
a register controller that determines a second address from which memory for a subsequently invoked second program routine is allocated by adding the local register pointer and the count value,
wherein the register adds the local register pointer and the count value only after the second program routine that requires additional registers has been selected.

30. The apparatus of claim 29, wherein the memory invoked for the second program routine does not overlap with the registers made available for the first program routine.

31. The apparatus of claim 29, wherein upon completion of the second program routine, the registers allocated to the second program routine are released for reuse by a third program routine.

32. The apparatus of claim 29, wherein the count value includes only the registers needed by the first program routine.

33. A method of controlling a register, comprising:
storing a local register pointer corresponding to a first address from which a first program routine is initiated;
determining a count value based on the type and number of variables declared by the first program routine, said count value corresponding to a total number of registers made available to perform the first program routine; and
determining a second address from which memory for a subsequently invoked second program routine is allocated by selectably adding the local register pointer and the count value.

34. The method of claim 33, further comprising:
allowing the second program routine to complete;
reallocating the memory allocated to the second program routine to a third program routine.

35. The method of claim 33, wherein the second address does not overlap the registers made available for the first program routine.

36. The method of claim 33, wherein the count value is determined by a compiler and the count value includes only the registers needed by the first program routine.

* * * * *